United States Patent Office 3,252,962
Patented May 24, 1966

3,252,962
PRODUCTION OF FISH PROTEIN
Wilson M. Whaley, Chicago, Ill., and Raymond J. Mosby, Westport, Conn., assignors to General Foods Corporation, White Plains, N.Y., a corporation of Delaware
No Drawing. Filed Feb. 5, 1963, Ser. No. 256,226
5 Claims. (Cl. 260—112)

This application is a continuation-in-part of the application Serial No. 811,542, filed May 7, 1959, now abandoned.

This invention relates to a protein concentrate from fish and more specifically to the production of a deodorized fish protein concentrate from fish having a high oil content.

As is well known, fish have a very high protein content and accordingly may serve as a source of this needed nutrient value. Typically about 20% of the edible portion of most fish is protein. However, it is also well known that fresh fish has a substantially short shelf life and the possibility of making wide use of this available protein is thus considerably limited.

It has heretofore been believed that conversion of fresh fish to a flour would permit attainment of a protein-containing product which would be suitable for a wide variety of uses. However, the various fish flours which have been prepared are particularly characterized by two prime defects: (a) they possess a fishy odor which renders them unsatisfactory, at best, for use in bland products, and (b) they have a very short shelf life and after a short period of time, become rancid and smelly.

Although in the case of cod or haddock, which contain only 1%–2% oil, it is possible to obtain a fish flour having a satisfactory flavor and a shelf life of a few months; this has not heretofore been possible in the case of fish having a high oil content. High oil-containing fish are typified by menhaden which has an oil content of 5%–20%, usually 12%.

The advantages of using high oil-content fish, such as menhaden, for use in preparing a high protein fish flour are manifold. Menhaden is the most abundant fish caught in the United States. In 1945, for example, the fisheries of the Middle Atlantic States landed 368.1 million pounds of menhaden fish out of a total catch of all fish of 433.1 million pounds. Thus menhaden represented 85% of all fish caught in that area, and similar percentages are found in other areas. In 1958 approximately two billion pounds of menhaden fish were caught in the United States.

Because of the defects of flour prepared from high-oil type fish, such as menhaden, this catch has found its way almost exclusively into animal feed and fertilizer, despite its high protein content and low price. It would, therefore, be highly desirable to obtain these proteinaceous flours in suitable condition for human food use.

It is an object of this invention to provide a technique for obtaining a high-protein fish flour of good quality from an oily fish. Other objects will be apparent on inspection of the following description.

This invention involves a process for preparing a proteinaceous flour from fish under conditions which prevent oxidation of the fat components of said flour and comprises comminuting fish, mixing said fish with water to form a slurry, adding an antioxidant to said slurry, said antioxidant being present in about 0.001–0.2% by weight of said slurry, acidifying said slurry to about the mean isoelectric point of the proteins contained therein thereby precipitating the protein, contacting said precipitated protein with a bland solvent thereby extracting lipoid material from the precipitated protein, separating solvent-extract from the precipitated protein, drying said protein at 90°–132° F., humidifying said dried protein to 10%–30% moisture, and drying said protein at 90°–132° F. to reduce the moisture content to less than 10% thereby obtaining a fish protein-flour free of odor, aroma, and taste.

According to certain aspects of this invention, a bland proteinaceous fish flour may be prepared from an oily fish by the process which comprises comminuting the fish, forming the water slurry, adding antioxidant to the slurry, acidifying the slurry to precipitate the protein, and then heating said slurry to about 155°–212° F. to thereby denature the protein. The protein is then separated from the slurry and extracted with a bland solvent. The solvent-extract is removed from said protein, the protein is dried at 90°–132° F., moistened to 10%–30% moisture, and then redried at 90°–132° F. The use of antioxidant may be minimized by conducting the extraction process in an inert gas atmosphere. However, even in this latter case an antioxidant is preferably incorporated at some stage of the process to improve the shelf life of the protein.

The fish which may be treated in accordance with this invention are preferably the oily fish including generally those fish having an oil content of at least about 5% and usually upwards of 10% to as high as 20%. Included within this group are e.g. herring (e.g. 11% oil content), mackerel (e.g. 13% oil content), king salmon (e.g. 16% oil content), sardine (e.g. 13% oil content), pilchard, and tuna. However, it is found that the advantages of this invention are obtained to an outstanding degree when the fish to be treated is menhaden, typically at an oil content of about 12%. It is a particular feature of this invention that the entire fish may be used, although scrap, offal, or trimmings can also be used if desired.

Preferably the charge of fish is either fresh fish (fish which has been stored at room temperature for not more than one day); fish refrigerated at 35° F. for less than 5–9 days; or fish refrigerated at 0° F. for less than 4 months and preferably less than 6 weeks. It is a particular feature of this invention that if the fish charge be stored for at least about one day and preferably up to about three days, under refrigeration at about 35° F., subsequent treatment including filtering, denaturing, etc., may be effected more easily. For example, the time of filtration may be decreased by as much as 40%. Under these conditions the product possesses the superior features herein set forth.

The so-treated fish, preferably whole, may be comminuted in e.g. a Hobart mill, a Fitzpatrick mill (typically having a #5 screen), or a Waring blender type mill. Comminution is effected to provide a product most of which will pass through about a 16–20 mesh screen on which the bulk of the bones and scale may be retained.

The comminuted fish is slurried with 2–10, preferably 2, volumes of water which contain sufficient acid, typically as sulfuric acid, to adjust the pH of the resulting slurry to about that of the mean isoelectric point of the proteins (of which actomyosin muscle protein may be the main one), i.e. to a pH of about 3.5–6.0, preferably 4.0–5.5. Generally, a lower pH will yield a lighter color product, and when this is the prime desideratum, the pH may be as low as 3.

In carrying out the process of this invention antioxidizing conditions should be observed. This is readily accomplished by incorporating an antioxidant such as ascorbic acid, butylated hydroxy anisole or butylated hydroxy toluene to the slurry in an amount ranging from 0.001% to about 0.2 by weight of the slurry. The particular antioxidant used is not critical and various antioxidants may be used. Suitable antioxidants for use in this invention include the following: tocopherols, i.e., alpha-, beta-, and gamma-tocopherol; gum guaiac; nordihydroguaiaretic acid; gallic acid and its esters, such as the propyl, butyl, amyl, hexyl, octyl, dodecyl, tetradecyl, hexadecyl, and octadecyl esters; ascorbic acid and isoascorbic acid and their esters, as for example, ascorbyl or isoascorbyl palmitate, stearate, etc.; thiodipropionic acid and its esters, as for example, the dioctyl and the didodecyl esters; phenolic derivatives, as for example, butylated hydroxy-anisole,
catechol monobenzoate,
2-tert-butyl 4-methoxy phenol,
p-tert-butyl catechol,
2,4-dimethyl-6-tert-butyl phenol dibenzyl catechol,
octyl cresol,
2,7-dihydroxy naphthalene,
2,5-dihydroxy diphenyl, etc.;
hydroquinone derivatives, as for example,
2,5-ditert-butyl hydroquinone,
2,5-dibenzyl hydroquinone,
2,5-ditert-amyl hydroquinone,
2,5-bis(dimethylaminomethyl) hydroquinone,
2,5-bis(dimethylaminomethyl) quinone,
2,5-bis(dimethylaminomethyl)-3,6-di-tert butyl hydroquinone,
2,5-bis(dimethylaminomethyl)-3,6-di-tert amyl hydroquinone,
2,5-bis(dimethylaminomethyl)-3,6-di-tert amyl quinone, etc.;
quinoline derivatives, as for example,
6-ethoxy-2,2,4-trimethyl-1,2-dihydroquinoline,
6-phenyl-2,2,4-trimethyl-1,2-dihydroquinoline,
2,2,4-trimethyl-1,2-dihydroquinoline, etc.;
hydrocaffeic acid and its esters, for example,
ethyl hydrocaffeate;
pyrogallol derivatives, as for example,
4-acetyl pyrogallol,
4-propionyl pyrogallol,
4-butyryl pyrogallol,
4-valeryl pyrogallol,
4-isovaleryl pyrogallol,
4-(diethyl-acetyl) pyrogallol,
4-acetyl-6-ethyl pyrogallol,
4-acetyl-6-tert butyl pyrogallol; and so forth.

Typically, for example, the antioxidant may be added in an amount of 1 ml. of 9% alcoholic solution of butylated hydroxy toluene per pound of fish.

Use of antioxidant may be eliminated or minimized when subsequent operations are effected very rapidly under conditions which preclude or minimize oxidation of the fish oils. This may be accomplished by conducting the operations in an oxygen-free environment, i.e. under nitrogen, carbon dioxide, or other inert gases. However, even when the process is conducted in an oxygen-free atmosphere it is preferred to incorporate an antioxidant in the fish slurry.

The slurry or paste is preferably screened through a 16–20 mesh screen to separate out bones and scale thus lowering the resulting ash content of the final product from a starting ash of about 15%–20% down to 4%–5% or less on a dry basis. The filtered bones and scales are water washed, the washings typically being combined with the slurry-filtrate and the bone and scale disposed of as by conversion to meal.

The slurry-filtrate, containing the deboned and descaled protein content of the fish, will be heated to 155°–212° F., preferably 175° F. Preferably heating is accomplished by adding the paste of slurry-filtrate to preheated water at the desired temperature. The mixture may be maintained hot for a period of 2 minutes up to 30–90 minutes, but preferably about 20 minutes.

Heating will produce the following results: (a) a denaturing of the protein; (b) a rupturing of the fat globules; (c) dissolution of the flavor precursors; (d) a dissociation of flavor complexes; (e) facilitation of subsequent separation; (f) a breakdown of the lipoproteins and proteo-lipids; and (g) a product having a greater shelf life, an inherently better stability, and a lower level of residual flavor and aroma precursors.

When the mixture is heated, as in the preferred embodiment, it is found that the product flour possesses a fine granular character. If a higher yield (i.e. 7%–10% higher) be desired rather than the aforementioned advantages of heating, heating may be omitted, and under these cold conditions the product flour may have a matted, fibrous texture.

The slurry may be filtered, preferably by centrifugal filtration, to give (a) a semi-solid wet cake of fish flour, typically in amount of about 10%–30%; (b) an oil, typically in amount of about 2%–8% (this comprising about 95%–99% of the oil originally in the fish); and (c) an aqueous solution of fish solubles containing amino acids, vitamins, proteins, etc. (which may be concentrated and sold as such), typically in amount of about 50%–90%. Preferably filtration is effected quickly to produce a semi-solid wet cake which may contain (a) 20%–60%, typically 40%–50% solids; (b) 50%–75% water; and (c) 3%–8% oil. This cake may then be mixed with a bland solvent to form a slurry or paste.

The bland solvents which may be employed in practice of this invention are those which can be used to extract from the filter cake a substantial portion of the lipoid (i.e. fatty and oily) material present therein and which permit attainment by the process of this invention of a protein-flour characterized by its blandness, freedom from odor, freedom from taste, good color, and extended storage life. The preferred solvents are those which do not react chemically with any of the components of the fish under the conditions prevailing during the practice of the invention and which are substantially non-toxic and not liable to produce toxicity in the product.

The bland solvents which may be employed include ethers, including water-miscible ethers, such as 1,4-dioxane; and ethers, including ether alcohols, including water-miscible ether alcohols such as methyl propylene glycol; or the methyl ethers of di- and tri-propylene glycols. The preferred specific materials include tertiary butyl alcohol and isopropyl alcohol. Solvents which are particularly desirable when the protein product is to be used for non-comestible purposes include Cellosolve (i.e. monoethyl ether of ethylene glycol), methyl propylene glycol, and 1,4-dioxane. Under certain conditions hereinafter noted, n-hexane, n-heptane, methyl Cellosolve, ethyl lactate, and ethanol may be employed. These bland solvents are characterized by the ability to produce a product protein or flour which is bland, i.e. the product has no sharp or pungent notes. A bland protein, however, is not characterized by an insipid or tasteless character.

It is a feature of this invention that the above solvents may be employed in pure anhydrous form or in the form of aqueous mixtures including azeotropic mixtures. Generally the aqueous bland solvents may contain up to 25% by weight water (but not in amount greater than the solubility of water therein). When isopropyl alcohol is employed, it will be as the azeotrope containing 12.3% by weight water and 87.7% by weight alcohol. Preferably when tertiary butyl alcohol is employed, it will be as the azeotrope containing 12% by weight water and 88% by weight alcohol.

It is a further feature of this invention that the various solvents may be used in mixture. For example, the solvent may be formed from the miscible components isopropyl alcohol and tertiary butyl alcohol; or from tertiary butyl alcohol and 1,4-dioxane.

The following specific combinations are among the preferred when two-solvent extractions are employed.

| First Solvent | Second Solvent |
|---|---|
| Isopropyl alcohol | Cellosolve. |
| Do | 1,4-dioxane. |
| Cellosolve | Isopropyl alcohol. |
| 1,4-dioxane | Isopropyl alcohol. |
| Do | Cellosolve. |
| Do | Ethyl Lactate. |
| N-Heptane | Cellosolve. |
| Do | 1,4-dioxane. |
| Do | Isopropyl alcohol. |
| Do | Cellosolve. |
| Do | 1,4-dioxane. |
| Methyl Cellosolve | Isopropyl alcohol. |
| Do | Ethanol. |

When the two-solvent technique is employed, it is preferred that the solvents be employed in the order shown.

It may be noted that it is possible to employ in connection with two-solvent extraction, solvents which are not preferred when a single solvent is employed e.g. n-hexane, n-heptane, and ethanol.

It is possible to employ dual solvent systems wherein the flour may be extracted with one solvent and subsequently with another. The solvents may be either water-immiscible or water miscible and either miscible or immiscible with each other. For example, a bland menhaden product was obtained by use of n-hexane (water-immiscible) and subsequently dioxane (water-miscible).

In the extraction operation, the semi-solid wet cake is slurried with solvent in ratio of one part of solvent to 0.2 to 1, say 0.5 part based on the weight of the original charge raw fish. The mixture may be heated, preferably under reflux for e.g. 2–20 minutes or longer. The reflux temperature for the water-isopropyl alcohol system is about 175° F. and that for water-tertiary butyl alcohol is also about 175° F. It will be apparent that various extraction techniques may be employed, such as a Soxhlet-type extraction.

The extraction operation is followed by a filtration to separate the solid from the solvent, the latter containing many of the undesirable flavors and odors and their precursors together with much of the oil and water. The slurrying, extraction, and filtering operations may be repeated a plurality of times, e.g., six times, either continuously or batchwise, to produce a solvent-wet cake (a flour) containing typically (e.g. when the solvent is azeotropic isopropyl alcohol) about 30% solids, 6% water, and 44% solvent.

It may be desirable under certain conditions to use an antioxidant during the extraction. Typically butylated hydroxy anisole in amount of 0.001–0.2% by weight of the solvent may be added to the last solvent, the antioxidant thus being plated or deposited on the flour during the final solvent extraction operation.

In accordance with this invention, the wet flour may be desolventized at temperatures of 90°–132° F., say 110° F., and preferably under pressure of 5 mm. Hg to 400 mm. Hg, say 25 mm. Hg. Operation at temperature less than about 132° F. minimizes deterioration of flavor components remaining in the flour.

The vacuum-dried flour possesses physical and chemical properties which are generally comparable to the best grades of commercial protein concentrates. However, it is characterized by a residual fishy odor and flavor, particularly when moistened to form e.g. a dough, which proscribes its use in bland products. The evaluation of the odor and flavor components of the protein-flour may be effected according to several techniques: (a) dry aroma—i.e. by smelling the dry flour; (b) steam aroma—i.e. by mixing the flour with e.g. 10 times its weight of water, boiling and noting the aroma of the vapors which are given off with the steam; (c) paste taste—i.e. by mixing the flour with about an equal amount of warm water and tasting; and (d) paste aroma—i.e. by smelling the warmed material of test (c). The odor or taste level in these tests is determined and reported on a scale ranging from 1 to 10 whereon 1 represents the minimum level which can be detected, 10 represents the maximum level found in fish, and a level below 5 represents a satisfactory level of blandness.

Elimination of the residual fishy odor and aroma may be effected in accordance with this invention by humidification. More specifically, the vacuum dried fish flour may be remoistened from its moisture level of 4% to 12%, say 6%–8%. Humidification or remoistening may be effected by adding water in amount sufficient to raise the moisture content to 10%–30%, and preferably to 20%–25%. When humidification is effected to less than 10%, e.g. 5%, some improvement is noted as hereinafter described, but full de-odorization and de-aromatization is not obtained; however, a plurality of "humidifications" to less than 10% e.g. each to 5% can be employed to obtain the desired product. Humidification to moisture contents above about 30% tends to discolor the otherwise light product and if the humidification be to e.g. 50% the product will be of very dark color—it will however be otherwise totally satisfactory with respect to odor and aroma.

The flour or protein, at this moisture content, will be dried, preferably vacuum dried, at pressure of 5 mm. Hg to 400 mm. Hg, say 25 mm. Hg and at temperatures of 90°–132° F., say 100° F. Drying is effected to a moisture content of less than 10% and preferably less than 8%, typically to about 5%–8%.

Humidification (including adjusting the moisture content and redrying) may be done once or as many times as desired, e.g. up to seven times. Each humidification decreases the amount of odor and aroma. Although commonly one humidification will remove virtually all of the residual flavor and odor of the product, two humidifications may be employed if desired. Naturally the number of humidifications will depend upon the type of raw material and the degree of purification desired. The final product may be made readily wettable, or dispersible if desired, by addition of small amounts (e.g. less than 1%, typically 0.25%) of wetting or dispersing agent and this may advantageously be done e.g. during the humidification or prior thereto or thereafter, but prior to final drying.

The fish protein or fish flour obtained by this process is characterized primarily by an odor, taste, and aroma which ranges from very faint to non-existent. Even under the least favorable conditions, the odor is non-fishy and it reflects neither the raw material from which it was prepared nor the solvents employed in its preparation (the solvent concentration in the product is substantially zero).

Typically the taste of the flour is bland and it is equivalent to or superior to high quality proteins such as egg or beef protein. The storage life is indefinite i.e. it may be stored for indeterminately long periods. For example, in one test at 90° F. and 85% relative humidity (very severe storage conditions) is was unchanged after two months. In comparison the best product heretofore available when stored 30 days at room temperature and humidity, gave off an odor which was both fish-life and solvent-like in character. On addition to water to form a paste, the new product developed no odor and its taste was bland. The best product heretofore available, when similarly treated, had a distinctly fish-like taste. The color and appearance of the new protein is substantially the equivalent of other available protein sources. Although, as heretofore indicated, it can be varied by the various treating conditions, the color may at worst be off-white depending on the prior treatment. Good light shades are easily obtained if desired.

Nutritionally, the product is fully the equivalent of the best protein available on the market, and its low cost, high availability, and long storage life make it a uniquely superior product.

Among the uses to which this novel high-quality protein product may be put the following may be noted: (a) as a protein-enriched supplement for (wheat) flour in any and all of its uses including manufacture of bread and cake of the highest quality; (b) in the preparation of a proteinaceous whipping agent; (c) as a protein enrichnent in connection with e.g. cereals, etc.; (d) as an adhesive; (e) as a binder, etc.; (f) as base for protein fibers and film; (g) as a key protein ingredient in fabricated foods. It may be further modified to provide a wide variety of uses including e.g. specific adhesives, food uses, etc.

The following specific examples are each illustrative of the technique of this invention. In each example the protein or flour which was obtained was characterized by a very light color, a bland taste, a bland odor, an extended shelf life, and in general, freedom from all of the undesirable attributes which have heretofore undesirably characterized prior art products.

*Example I*

About 225 pounds of whole menhaden was ground in a Fitzpatrick mill and added to 50 gallons of water heated to 175° F. To the slurry was added a quantity of 10% sulfuric acid to reduce the pH to 5.0. As an antioxidant, 225 ml. of 9% butylated hydroxytoluene in azeotropic tertiary butyl alcohol was added. The slurry was vigorously agitated. After 15 minutes the slurry was screened through a #18 mesh screen. The screened slurry was heated to 155°–175° F. for 20 minutes and filtered through cloth in a Shriver plate and frame press.

The filter cake was mixed with 50 gallons of azeotropic tertiary butyl alcohol. The vigorously stirred slurry was heated to 155°–165° F. and held at this temperature for 20 minutes. The slurry was filtered in a Shriver filter press. The alcohol extraction operation was repeated six more times. About 225 ml. of 9% butylated hydroxytoluene were added to the slurry in each of the first two alcohol extraction steps.

After the seventh alcohol extraction, the pressed fish cake was chopped in a Fitzpatrick mill, and then dried in a vacuum pan dryer equipped with an agitator for 24 hours at 90°–110° F. To the substantially dry flour was added a quantity of water equal to 20% of the weight of flour. The flour was passed through a Fitzpatrick mill to ensure proper wetting and was then dried in a rotary double cone vacuum dryer at 90°–110° F. The resulting flour was light in color and had a bland taste and odor.

*Example II*

The procedure of Example I was followed except that 91% isopropyl alcohol was substituted for the azeotropic tertiary butyl alcohol.

*Example III*

The procedure of Example I was followed except that in addition thereto the filter cake which was retained within the plate and frame press was washed with 50 gallons of water (176° F.), water having a pH of 5.0. Use of this technique was found to ease the subsequent solvent extractions i.e. they were more easily effected and the product was lighter and even more bland than the product of Example I.

*Example IV*

The procedure of Example I was followed except that after the filter cake had been extracted for the third time with alcohol, it was washed with 50 gallons of hot water at temperature of 175° F. and pH 5.0, and subsequently subjected to extraction with alcohol for 3 more times. This technique gave a more efficient extraction of the water extractibles, and the product was even more bland and lighter than the product of Example III.

*Example V*

The procedure of Example I was followed except that the quantity of sulfuric acid added to the slurry was sufficient to lower the pH to 3.0. The resulting product was found to have a lighter color than the product prepared at pH 5.

*Example VI*

A mixture consisting of 1990 grams of ground whole menhaden and 3980 ml. of water was blended in a Waring blender for one minute. The pH of the slurry was adjusted to 5.0 with 75.0 ml. of 10% sulfuric acid. Twenty ml. of 2% butylated hydroxytoluene in 95% ethyl alcohol were also added. The slurry was centrifuged and 2177 grams of cake, containing 20% solids, was obtained. The cake was extracted three times at room temperature with pure tertiary butyl alcohol using the following fish to solvent ratios: 1:1.67, 1:1.33, 1:1. Then four solvent extractions at 1:2 ratios at 175° F. were carried out. Each extraction was for 2–3 minutes in a mechanical mixer. The product was desolventized by air drying for 72 hours. The product weighed 286 grams. The flour was humidified to 20% moisture and redried. The product was absolutely bland and when mixed with boiling water had no trace of fishy notes.

*Example VII*

The procedure of Example VI was followed except that the acidified slurry was heated to 165° F. prior to the centrifugal filtration.

*Example VIII*

The procedure of Example VII was followed except that the butylated hydroxytoluene was not added—the system being blanketed with nitrogen during the entire operation.

*Example IX*

The procedure of Example VIII was followed except that the system was blanketed with carbon dioxide instead of nitrogen. In Example IX as well as in Example VIII the protein-flour product which was obtained was superior to the product of Example VII with respect to light color, blandness, aroma, and odor.

*Example X*

A mixture consisting of 1990 grams of fresh ground whole menhaden and 3980 ml. of water was blended in the Waring blender for 1 minute. The pH of the slurry was adjusted to 5.0 with 75.0 ml. of 10% sulfuric acid. 20 ml. of 2% 1,2-dihydro-2,2,4-trimethyl-6-ethoxy quinoline (sold under the trademark Santoquin) in 95% ethyl alcohol were also added as an antioxidant. The slurry was heated to 155°–160° F. and digested with acid. It was then centrifuged and then 2177 grams of cake containing 20% solids was obtained. The cake was then subjected to 4 solvent extractions at 1:2 ratios at 20° C. (i.e. room temperature). Each extraction was for 2–3 minutes in a mechanical mixer. The product was desolventized by air drying for 72 hours. It was humidified to 20% moisture and redried.

*Example XI*

The procedure of Example VI was followed except that Cellosolve was used as solvent rather than pure tertiary butyl alcohol, and the extractions were carried out at 195° F.

*Example XII*

The procedure of Example XI was followed except that the acidified slurry was heated to 175° F. prior to centrifugal filtration.

Example XIII

The procedure of Example I was followed except that the solvent employed was propylene glycol methyl ether instead of azeotropic tertiary butyl alcohol.

Example XIV

The procedure of Example I was followed except that the solvent employed was tripropylene glycol methyl ether instead of azeotropic tertiary butyl alcohol.

Example XV

The procedure of Example I was followed except that the solvent employed was tripropylene glycol methyl ether instead of azeotropic tertiary butyl alcohol.

Example XVI

The procedure of Example I was followed except that in place of azeotropic tertiary butyl alcohol, the solvent employed was a mixture of mono-, di- and tri-propylene glycolomethyl ethers (available under the name Dowanol 93B2, a trademark).

Example XVII

In the practice of this example, the technique of Example I was followed on two separate runs, the runs being separately conducted under identical conditions up to the extraction step. A semi-continuous extraction technique was conducted wherein the solvent liquors from the second extraction in run #1 were used as the first extractant for run #2; the solvent liquors from extraction #3 of run #1 were used as the extractant for the second extraction of run #2; the solvent liquors from extraction #4 of run #1 were used as the extractant for the third extraction of run #2; the solvent liquors from extraction #5 of run #1 were used as the extractant for the fourth extraction of run #2; the solvent liquors from extraction #6 or run #1 were used as the extractant for the fifth extraction of run #2.

Example XVIII

About 1300 grams of frozen menhaden (stored at 0° F. for 23 days) was ground in a Waring blender with 2600 ml. of boiling water containing 13 ml. of 2% butylated hydroxytoluene and 60 ml. of 10% H$_2$SO$_4$. The slurry was screened through a 16 mesh screen and then centrifuged at 200 r.p.m. for 15 minutes. The wet cake was mixed with 2600 ml. of boiling azeotropic tertiary butyl alcohol in a Waring blender for 5 minutes and filtered. The cake was extracted with 2 liters of 100% tertiary butyl alcohol at the boiling point of the solvent for 5 minutes seven times. The desolventized cake was humidified to 20% and dried in vacuo. The product was bland. Pure tertiary butyl alcohol and 75% tertiary butyl alcohol were used for the seven extractions in two other runs and were satisfactory in that a bland flour resulted after humidification and drying.

Example XIX

A mixture of 600 grams of ground fresh menhaden, 1200 ml. of H$_2$O, 6 ml. of 2% butylated hydroxytoluene was ground in a Waring blender for 30 seconds. The pH was adjusted to 5.0 with 15 ml. of 10% H$_2$SO$_4$ and the slurry heated to 175° F. during 20 minutes, and then filtered. The acid cake was then subjected to solvent extraction in a 2-stage operation, each stage being characterized by the solvent. The solvent employed in the first stage is that noted hereinafter in the first column of the tabulation; and the solvent employed in the second stage is that noted in the second column of the tabulation below. In each of these dual-solvent operations, the acid cake was extracted first with 1000 ml. of first-stage solvent; then with 800 ml. in the second step; and then with 600 ml. in the third step, each extraction including heating the solvent acid cake to reflux temperature for 10 minutes. The second stage extraction, i.e. extraction with the second solvent, included 3 extractions each with 1200 ml. of fresh solvent, the mixture being heated at reflux temperature for 10 minutes.

| First Stage | Second Stage |
|---|---|
| Isopropyl alcohol | Cellosolve. |
| Do | Isopropyl alcohol. |
| Do | 1,4-dioxane. |
| Cellosolve | Cellosolve. |
| Do | Isopropyl alcohol. |
| 1,4-dioxane | Isopropyl alcohol. |
| Do | Cellosolve. |
| Do | Ethyl Lactate. |
| Do | Dioxane. |
| n-Heptane | Cellosolve. |
| Do | Dioxane. |
| n-Hexane | Isopropyl alcohol. |
| Do | Cellosolve. |
| Do | Dioxane. |
| Methyl Cellosolve | Isopropyl alcohol |
| Do | Ethanol. |

Example XX

About 500 grams of whole herring was ground in a Fitzpatrick mill and added to 1000 grams of water heated to 175° F. To the slurry was added a quantity of 10% sulfuric acid to reduce the pH to 5.0. As an antioxidant 225 ml. of 9% butylated hydroxytoluene in azeotropic tertiary butyl alcohol was added. The slurry was vigorously agitated. After 15 minutes the slurry was screened through a #18 mesh screen. The screened slurry was heated to 155°–175° F. for 20 minutes and filtered through cloth in a Shriver plate and frame press.

The filter cake was mixed with 750 gallons of azeotropic tertiary butyl alcohol. The vigorously stirred slurry was heated to 155°–170° F. and held at this temperature for 20 minutes. The slurry was filtered in a Shriver filter press. The alcohol extraction operation was repeated six more times. About 225 ml. of 9% butylated hydroxytoluene were added to the slurry in each of the first two alcohol extraction steps.

After the seventh alcohol extraction, the pressed fish cake was chopped in a Fitzpatrick mill, and then dried in a vacuum pan dryer equipped with an agitator for 24 hours at 90°–110° F. To the substantially dry flour was added a quantity of water equal to 20% of the weight of flour. The flour was passed through a Fitzpatrick mill to ensure proper wetting and was then dried in a rotary double cone vacuum dryer at 90°–110° F. The resulting flour was light in color and had a bland taste and odor.

Example XXI

About 500 grams of whole mackerel was ground in a Fitzpatrick mill and added to 1000 grams of water heated to 175° F. To the slurry was added a quantity of 10% sulfuric acid to reduce the pH to 5.0. As an antioxidant, about 225 ml. of 9% butylated hydroxytoluene in azeotropic tertiary butyl alcohol was added. The slurry was vigorously agitated. After 15 minutes the slurry was screened through a #18 mesh screen. The screened slurry was heated to 155°–175° F. for 20 minutes and filtered through cloth in a Shriver plate and frame press.

The filter cake was mixed with 750 gallons of azeotropic tertiary butyl alcohol. The vigorously stirred slurry was heated to 155°–170° F. and held at this temperature for 20 minutes. The slurry was filtered in a Shriver filter press. The alcohol extraction operation was repeated six more times. About 225 ml. of 9% butylated hydroxytoluene were added to the slurry in each of the first two alcohol extraction steps.

After the seventh alcohol extraction, the pressed fish cake was chopped in a Fitzpatrick mill, and then dried in a vacuum pan dryer equipped with an agitator for 24 hours at 90°–110° F. To the substantially dry flour was added a quantity of water equal to 20% of the weight of flour. The flour was passed through a Fitzpatrick mill to ensure proper wetting and was then dried in a rotary double cone vacuum dryer at 90°–110° F. The resulting flour was light in color and had a blande taste and odor.

In all cases the protein or flour prepared in accordance with these examples was found to be highly satisfactory with respect to its blandness, freedom from fishy aroma, fishy taste, and fishy odor, and its extended storage life.

*Example XXII*

As a typical illustration of the use to which this protein product may be put, it was made into a thin (Italian style) waffle, which is commonly made with wheat flour. To obtain a comparison, three runs were made, the first wherein 100% all-purpose wheat flour was employed; the second wherein a mixture of 10% fish flour prepared in accordance with Example I was mixed with 90% wheat flour; and the third wherein the mixture contained 25% fish flour and 75% wheat flour.

In each case, two eggs were placed in a mixing bowl and mixed with 70 ml. of molten vegetable shortening (Crisco), 75 grams of sugar, 0.5 teaspoon of baking powder, and 0.5 teaspoon of vanilla extract flavoring. After mixing at the lowest possible speed for about two minutes, 130 grams of the flour (i.e. the wheat flour or the mixture thereof with fish flour) was added and the mixture assumed a waffle batter-like consistency.

The thick elastic paste was placed in a hot "Italian Waffle" iron (which makes thin 0.25-inch waffles) heated on a burner. Cooking time was about 30 seconds, and the product was crunchy in texture.

The waffles containing the fish flour were completely free of fishy taste, fishy aroma, or fishy odor. They were bland, of light color, and had a good texture.

Typically the improved fish protein product of this invention may have the following composition on a dry basis: protein 92%–98%, typically 75.3%; ash 4%–6%, typically 4.57%; fat 0.02%–0.4%, typically 0.17%.

It will be apparent that while this invention has been described in terms of specific examples, that various changes and modifications may be made thereto which fall within the scope of this invention.

What is claimed is:

1. The process of preparing a proteinaceous flour from fish under conditions which prevent oxidation of the fat components of said flour which comprises comminuting the fish, mixing said comminuted fish with water to form a slurry, adding an antioxidant to said slurry, said antioxidant being present in about 0.001–0.2% by weight of said slurry, acidifying said slurry to about the mean isoelectric point of the proteins contained therein thereby precipitating the protein, contacting said precipitated protein with a bland solvent thereby extracting lipoid material from said precipitated protein, separating solvent-extract from said precipitated protein, drying said precipitated protein at a temperature of 90°–132° F., humidifying said dried protein to 10–30% moisture, and redrying said protein at a temperature of 90°–132° F. to reduce the moisture content of the protein to less than about 10% thereby obtaining a fish protein-flour free of odor, aroma, and taste.

2. The process of preparing a proteinaceous flour from fish as claimed in claim 1 wherein the acidified slurry is heated to 155°–212° F. to denature the protein prior to separating said protein from said solvent.

3. The process of preparing a proteinaceous flour from menhaden fish which comprises comminuting whole menhaden fish, mixing said comminuted whole fish with water to form a slurry, adding an antioxidant to said slurry, said antioxidant being present in about 0.001–0.2% by weight of said slurry, acidifying said slurry to about pH 4.5–5.0 to precipitate the protein, separating the coarse portions of said comminuted fish from said slurry thereby de-ashing said slurry, heating said slurry, filtering said slurry to obtain as filter cake a wet fish flour, contacting said cake with a bland solvent, heating said cake and said solvent to 155°–212° F., continuing to contact said cake and said solvent thereby extracting lipoid material from said cake and said solvent, separating solvent-extract from said cake, drying said cake at 90°–132° F., humidifying said dried solids to 10–30% moisture, and redrying said cake to a moisture content of less than about 10% thereby obtaining a fish protein-flour free of odor and aroma.

4. The process of preparing a proteinaceous flour from fish which comprises comminuting the fish, mixing said comminuted fish with water to form a slurry, adding an antioxidant to said slurry, said antioxidant being present in about 0.001–0.2% by weight of said slurry, acidifying said slurry to about the mean isoelectric point of the proteins contained therein thereby separating the solids from said slurry, contacting said solids with a first bland solvent thereby extracting lipoid material from said solids, separating a first solvent-extract from said solvents, thereafter contacting said solids with a second bland solvent thereby extracting the remainder of the lipoid material from said solids, separating a second solvent-extract from said solids, drying said solids at a temperature of 90°–132° F., humidifying said dried solids to 10–30% moisture and redrying said solids at a temperature of 90°–132° F. to a moisture content of less than about 10% thereby obtaining a fish protein-flour free of odor, aroma, and taste.

5. The process of claim 4 wherein the acidified slurry is heated to 155°–212° F. to denature the protein prior to separating said solids from said solvent extract.

No references cited.

WILLIAM H. SHORT, *Primary Examiner.*